(12) United States Patent
Lebrun et al.

(10) Patent No.: US 11,619,001 B2
(45) Date of Patent: *Apr. 4, 2023

(54) INFINITY SHAPE COILS FOR INDUSTRIAL FABRICS

(71) Applicant: Albany International Corp., Rochester, NH (US)

(72) Inventors: Joseph Louis Lebrun, Anderson, SC (US); Francis L. Davenport, Ballston Lake, NY (US)

(73) Assignee: Albany International Corp., Rochester, NH (US)

( * ) Notice: Subject to any disclaimer, the term of this patent is extended or adjusted under 35 U.S.C. 154(b) by 154 days.

This patent is subject to a terminal disclaimer.

(21) Appl. No.: 16/890,273

(22) Filed: Jun. 2, 2020

(65) Prior Publication Data

US 2020/0299899 A1 Sep. 24, 2020

Related U.S. Application Data

(63) Continuation of application No. 13/827,584, filed on Mar. 14, 2013, now Pat. No. 10,689,807.

(51) Int. Cl.
*D21F 1/00* (2006.01)
*F16G 3/02* (2006.01)

(52) U.S. Cl.
CPC .......... *D21F 1/0054* (2013.01); *D21F 1/0072* (2013.01); *F16G 3/02* (2013.01); *Y10T 24/164* (2015.01); *Y10T 24/1636* (2015.01)

(58) Field of Classification Search
CPC ........ D21F 1/0054; D21F 1/0072; D21F 1/00; F16G 3/02; Y10T 24/1636; Y10T 24/164
See application file for complete search history.

(56) References Cited

U.S. PATENT DOCUMENTS

| | | | |
|---|---|---|---|
| 785,019 A | 3/1905 | Parker | |
| 1,260,065 A | 3/1918 | Ryan | |
| 1,427,008 A | 8/1922 | Matsumoto | |
| 2,840,983 A | 7/1958 | Keilbach | |
| 3,147,586 A | 9/1964 | Archer | |
| 3,238,594 A | 3/1966 | Schuster | |
| 3,546,330 A * | 12/1970 | Thompson ............. | B65H 21/00 24/DIG. 37 |
| 3,641,831 A | 2/1972 | Palmaer | |

(Continued)

FOREIGN PATENT DOCUMENTS

| CA | 1329502 A | 5/1994 |
|---|---|---|
| EP | 0 524 478 A | 1/1993 |

(Continued)

OTHER PUBLICATIONS

Zou, Ningyu, *Dictionary of Glass Fiber Reinforced Plastic*, Chemical Industry Press, Dec. 31, 2008, pp. 203-204 with English abstract.

(Continued)

*Primary Examiner* — Scott R. Walshon
(74) *Attorney, Agent, or Firm* — McCarter & English, LLP

(57) ABSTRACT

An industrial fabric/belt including spiral coils shaped as a symbol for infinity or a lemniscate, i.e., infinity elements, are joined to each other with a pintle. A fabric element is configured as a continuous loop to form an industrial fabric employing a plurality of infinity coil elements.

9 Claims, 8 Drawing Sheets

(56) References Cited

U.S. PATENT DOCUMENTS

| | | |
|---|---|---|
| 3,646,752 A | 3/1972 | Kampfer |
| 4,469,221 A | 9/1984 | Albert |
| 4,476,902 A | 10/1984 | Westhead |
| 4,493,391 A | 1/1985 | Van Patten |
| 4,539,730 A | 9/1985 | Romanski |
| 4,649,619 A | 3/1987 | Romanski |
| 4,678,059 A | 7/1987 | Bowker |
| 4,791,708 A | 12/1988 | Smolens |
| 4,839,213 A | 6/1989 | Gauthier |
| 4,862,926 A | 9/1989 | Barrette et al. |
| 4,896,702 A | 1/1990 | Crook |
| 5,005,610 A | 4/1991 | Davenport |
| 5,049,425 A | 9/1991 | Essele |
| 5,334,440 A | 8/1994 | Halterbeck et al. |
| 5,503,196 A | 4/1996 | Josef et al. |
| 5,514,438 A | 5/1996 | Crook, Jr. |
| 5,514,456 A | 5/1996 | Lefferts |
| 5,609,076 A | 3/1997 | Idland |
| D396,658 S | 8/1998 | Engel |
| 5,819,811 A | 10/1998 | Baker et al. |
| D400,468 S | 11/1998 | Norman |
| 6,213,164 B1 | 4/2001 | Ostermayer et al. |
| 6,255,998 B1 | 7/2001 | Podger |
| 6,267,068 B1 | 7/2001 | Fickers et al. |
| 6,349,749 B1 | 2/2002 | Quigley |
| 6,353,976 B1 | 3/2002 | Sutherland |
| 6,918,998 B2 | 7/2005 | Hansen |
| 7,273,074 B2 | 9/2007 | Hansen |
| 7,360,642 B2 | 4/2008 | Perrin et al. |
| 7,448,416 B2 | 11/2008 | Harrison |
| 7,575,659 B2 | 8/2009 | Billings |
| 7,691,238 B2 | 4/2010 | Billings |
| 10,689,796 B2 * | 6/2020 | Lebrun ................ D21F 1/0072 |
| 10,689,807 B2 * | 6/2020 | Lebrun ................ D21F 1/0054 |
| 2007/0084243 A1 | 4/2007 | Moore |
| 2009/0061151 A1 | 3/2009 | LaFond et al. |
| 2011/0146913 A1 | 6/2011 | Harwood |
| 2011/0315480 A1 * | 12/2011 | Maurice ................ A62B 1/14 182/193 |

FOREIGN PATENT DOCUMENTS

| | | |
|---|---|---|
| EP | 0 666 366 A | 8/1995 |
| EP | 0 674 041 A | 9/1995 |
| FR | 497451 | 12/1919 |
| FR | 2352994 A1 | 12/1977 |
| GB | 1450988 | 9/1976 |
| JP | 48-011793 B | 4/1973 |
| JP | 02-068389 A | 3/1990 |
| JP | 2004-115936 A | 4/2004 |
| RU | 2 408 756 C2 | 1/2011 |
| RU | 2 516 803 C2 | 5/2014 |
| TW | I 224638 B | 12/2004 |
| WO | WO 90/06386 A1 | 6/1990 |
| WO | WO 91/12441 A1 | 8/1991 |
| WO | WO 03/102299 A1 | 12/2003 |
| WO | WO 2007/027915 | 3/2007 |
| WO | WO 2011/022831 A1 | 3/2011 |
| WO | WO 2011/127594 A1 | 10/2011 |

OTHER PUBLICATIONS

First Office Action issued by Chinese Patent Office for corresponding Chinese application 201480014960.1 dated Aug. 8, 2016 with English summary.

International Search Report and Written Opinion issued by European Patent Office, acting as the International Searching Authority, for corresponding application PCT/US2014/023289 dated Jun. 16, 2014.

* cited by examiner

INFINITY SHAPE COILS FOR INDUSTRIAL FABRICS

FIELD OF THE INVENTION

The present invention relates to industrial fabrics. More specifically, the present invention relates to industrial fabrics/belts assembled from spiral elements or infinity shaped coil elements and formed into a continuous or endless loop.

INCORPORATION BY REFERENCE

All patents, patent applications, documents and/or references referred to herein are incorporated by reference, and may be employed in the practice of the invention.

BACKGROUND OF THE INVENTION

Industrial fabrics means endless structures in the foam of a continuous loop, and used generally in the manner of conveyor belts. As used throughout this disclosure, "industrial fabrics" refers to fabrics configured for modern papermaking machines, and engineered fabrics, which may be used in the production of nonwovens. Modern papermaking machines employ endless fabrics/belts configured for use in the forming, pressing, and drying sections, as well as process belts such as shoe press or transfer belts, which may also be used in sections of the modern papermaking processes, such as in the pressing section. Engineered fabrics specifically refers to fabrics/belts used outside of papermaking, including use on preparation machinery for paper mills (i.e., pulp), or in the production of nonwovens, or fabrics used in the corrugated box board industries, food production facilities, tanneries, and in the building products and textile industries. (See, for example, *Albany International* 2010 Annual Report and 10-*K*, Albany International, 216 Airport Drive, Rochester, N.H. 03867, dated May 27, 2010.)

In the formation of industrial fabrics, the base structure or a component thereof may take a number of different forms. For example, the fabric may be woven endless or flat woven, and subsequently rendered into an endless form with a seam. Industrial fabrics, as endless loops, have a specific length, measured circumferentially therearound, and a specific width, measured transversely thereacross. In many applications, industrial fabrics must maintain a uniform thickness, or caliper, to prevent, for example, premature wear in areas where a localized thickness is greater than in the immediate surrounding area, or objectionable marking of a manufactured good carried thereon or contacted thereby.

Industrial fabrics used in modern papermaking machines and in the production of nonwovens may have a width from about 5 feet to over 33 feet, a length from about 40 feet to over 400 feet, and weigh from approximately 100 pounds to over 3,000 pounds, for example.

Because of their size and weight, and the configuration of the industrial machines on which they are used, in many applications it is often convenient to install industrial fabrics on the appropriate machine as a flat article having lengthwise and widthwise edges, and joining the widthwise edges with a seam, for example, to form a continuous belt. When installed flat and formed into a continuous loop structure on an industrial machine, such industrial fabrics may be known as on-machine-seamable fabrics.

Seams, however, have presented problems in the function and use of on-machine-seamable fabrics in that they may have a thickness, or caliper, that is different from that of the industrial fabric edges the seam is joining. Variations in thickness between the seam and the fabric edges can lead to marking of the product carried on the fabric. Seam failure may also result if the seam area has a greater thickness than the fabric edges as the seam is exposed to machine components and resulting abrasion or friction.

To facilitate seaming, many fabrics for industrial use have seaming loops formed on two opposite edges of the fabric to be joined. For example, seaming loops themselves may be formed from the warp yarns of a flat woven fabric. Seaming loops can be formed by removing weft yarns at the ends of the fabric to free end portions of warp yarns. Loops are formed by reintroducing (re-weaving) the free end portions of the warp yarns into the fabric.

A seam is formed by bringing the two ends of the fabric together, by interdigitating and alternating the seaming loops at the two ends of the fabric to align the openings in the loops to form a single passage, and by directing a pin, or pintle, through the passage to lock the two ends of the fabric together.

Alternatively, in one of the earliest uses of spiral link coils, a seaming spiral may be attached to the seaming loops at each of the two ends of an industrial fabric. An example of this method is shown in U.S. Pat. No. 4,896,702 to Crook in which a multilayer industrial fabric is formed. As shown, a tubular base fabric is formed, flattened to form edges at the lengthwise extremities of the fabric, and cross machine direction ("CD") yarns in the area of the edges are removed. A spiral coil is attached to the seaming loops of the industrial fabric. Alternately, the seaming spirals may be connected to the seaming loops by at least one connecting yarn. The coils of the spirals at the two ends of the industrial fabric may again then be interdigitated and joined to one another on the machine with a pintle to form a seam usually referred to as a spiral seam.

Regardless of how the seam is formed, the construction of the seam differs from that of the rest of the fabric. Uniformity in characteristics such as permeability to air or water, thickness or caliper, and density, among others, is desirable in industrial belts. In known on-machine-seamable fabrics, construction of the seam area is different than the construction of the rest of the fabric. Because uniform physical characteristics across the length and width of the industrial fabric are usually preferred, and may be required, a seam is a critical part of a seamed fabric. If the seam itself is not structurally and functionally nearly identical to the rest of the industrial fabric, modification of the seam area may be necessary to obtain characteristics sufficiently similar to the main portion of the industrial fabric for the intended application.

One well known fabric, which has a body similar to the seam is the spiral link belt disclosed in U.S. Pat. No. 4,839,213 to Gauthier, for example. The '213 patent discloses a conveyor belt made of spirals assembled together by inserting rods into channels formed by interdigitating adjacent spirals. The belt includes a flat or other shaped member (known as "stuffer") which is inserted inside the spirals so as to completely or partially fill the spaces inside the spirals. There are certain drawbacks of using such a belt, however. For example, the belt has a relatively stiff body due to the use of stuffers within the spirals to achieve the desired lower air permeability. Also additional expense, a separate process step to insert the stuffers, and additional mass are drawbacks. The spiral link coils, when made full width, can sometimes fail at one location and "unzip" across the CD when the belt is running on the machine, which can result in belt failure and significant damage to the paper machine components.

Another example of an industrial fabric is disclosed in U.S. Pat. No. 6,918,998 to Hansen, which relates to a fabric manufactured from preformed rings. The rings in the '998 patent are connected with MD or CD yarns, pintles or wires to form a flat fabric, whose ends are joined to one another to form a continuous loop. The rings disclosed in this patent are preferably manufactured from rigid materials, which make them relatively stiff and incompressible.

Therefore, a need exists for industrial fabrics, for example on-machine-seamable fabrics, which are easy to manufacture and have uniform characteristics throughout the length and width of the fabric.

SUMMARY OF THE INVENTION

Accordingly, one embodiment of the present invention is an on-machine seamable fabric/belt made from a plurality of spiral elements joined together to provide uniform characteristics across the length and width of the belt.

One embodiment of the present invention provides spiral elements which may be attached to each other to form an industrial fabric/belt. Also provided is an endless structure formed from a plurality of spiral elements according to this invention and a method of making an endless industrial fabric/belt with the presently disclosed spiral elements, which can be on-machine seamable.

According to aspects of this invention, the spiral elements for use in forming the industrial fabric/belt are shaped as an "infinity coil," so named because an axial view of the coil resembles an infinity symbol, commonly, a figure-eight shaped curve, or mathematically a lemniscate. As such, each element has two loops, and the first loop of one element interdigitated with the second loop of the adjacent element to accept a pintle, or pin through a passage formed by the interdigitated loops. A plurality of these spiral elements are interdigitated and joined together until the required fabric length is formed.

As used in this application, an infinity coil is a shaped coil of material which can, for example, be a monofilament, twisted multifilament, coated or uncoated, or coated or uncoated metal wire, comprising two loops formed by the material passing alternately over and under a pair of parallel linear coplanar support members and crossing in the space between the support members. The support members may be, for example, a double mandrel or a spiral link-type forming apparatus. The loops may be substantially the same size and shape, although differing sizes and shapes are anticipated for certain applications. In forming an infinity coil, a double mandrel is provided comprising two adjacent support members, generally parallel and coplanar to each other, and spaced apart from each other with a center-to-center spacing proportional to the desired center-to-center distance of the loops of the infinity coil. A material, for example, a polyester monofilament, passes over a first mandrel, passes through the space between the two mandrels, passing below and then around and over the top of the second mandrel, back through the space between the mandrels and under the first mandrel. Thus, in a complete turn, the material used to form an infinity coil traces the basic curved shape of a lemniscate, or figure-eight, or infinity symbol. Subsequent infinity coils turns are formed in the same way, offset axially from the previous infinity coil turn. Coil turns can be added until the desired number of coils is formed or the desired axial length, which may be proportional to the number of coils, results.

Other methods may be used to form the infinity coil as will be apparent from the following disclosure. One embodiment of the present invention is an industrial fabric including a plurality of infinity coils having a CD length equivalent to the fabric width, the coils arranged such that one of first and second loops of a first infinity coil interdigitates with one of first and second loops of an adjacent infinity coil so as to form a single passage, a pintle extending through the passage, and one or more infinity coils added to the first infinity coil or adjacent infinity coil until the required MD length of the fabric is achieved.

Another embodiment of the present invention is an industrial fabric/belt including a plurality of infinity coil elements, each of the infinity coil elements having a first loop and a second loop, wherein second loop of a first infinity coil element, having an open interior portion, and first loop of the second infinity coil element, having an open interior portion, are interdigitated such that the open interior portions of the second loop of the first infinity coil element at least partially aligns with first loop of the second infinity coil element to form a passage therethrough, and a pintle disposed in the passage formed by the aligned loops to join the first infinity coil element to the second infinity coil element.

Yet another embodiment of the present invention is an industrial fabric including a plurality of coil materials formed as three or more closed curves forming three or more adjacent coil loops, the three or more coil loops enclosing respective open interior portions, and intersection regions between adjacent coil loops in which the coil material Ruining a coil loop intersects with material forming an adjacent coil loop.

Yet another embodiment of the present invention is a coil including at least one infinity coil element comprising a plurality of loops, each of the loops having an axis parallel to and collinear with the axis of each of the other loops of the plurality of loops, wherein, when viewed parallel to an axis of one of the plurality of loops, each of the plurality of loops forms a closed curve with a respective open interior portion.

Yet another embodiment of the present invention is a coil including a coil axis, an axial length parallel to the coil axis, a width perpendicular to the axial length, a continuous strand of material formed into a continuous helical plurality of infinity coil elements, each of the plurality of infinity coil elements comprising at least a first loop and a second loop, each of the loops having an axis parallel to and collinear with the axis of the coil, wherein, the axes of the at least first loops are collinear with one another and the axes of the second loops are collinear with one another such that, when viewed parallel to the coil axis, each of the plurality of loops appears to form a closed curve with an open interior portion.

Yet another embodiment of the present invention is a coil element including a coil material formed as a lemniscate having two closed curves forming first coil loops and second coil loops, the first and second coil loops enclosing respective first and second open interior portions, and an intersection region between the closed curves in which the coil material forming the first coil loop intersects with material forming the second coil loop.

Yet another embodiment of the present invention is a coil element including a coil material formed as three or more closed curves forming three or more adjacent coil loops, the three or more coil loops enclosing respective open interior portions, and intersection regions between adjacent coil loops in which the coil material forming a coil loop intersects with material forming an adjacent coil loop.

It is noted that in this disclosure and particularly in the claims, terms such as "comprises," "comprised," "comprising" and the like can have the meaning attributed to it in U.S. Patent law; e.g., they can mean "includes," "included," "including" and the like.

For a better understanding of the invention, its advantages and specific objects obtained by its use, reference is made to the accompanying descriptive matter in which preferred, but non-limiting, embodiments are illustrated.

BRIEF DESCRIPTION OF THE DRAWINGS

The following detailed description, given by way of example and not intended to limit the invention to the disclosed details, is made in conjunction with the accompanying drawings, in which like references denote like or similar elements and parts, and in which.

DETAILED DESCRIPTION

Embodiments of the invention are described below with reference to the accompanying drawings which depict embodiments of the disclosed infinity coil and exemplary applications thereof. However, it is to be understood that application of the disclosed infinity coil is not limited to those embodiments illustrated. Also, the invention is not limited to the depicted embodiments and the details thereof, which are provided for purposes of illustration and not limitation.

The present invention relates to industrial fabrics/belts, and includes engineered fabrics and fabrics used in papermaking. The present invention also relates to a process for producing such industrial fabrics/belts.

According to one exemplary embodiment, the fabric/belt may be a fabric comprised of a plurality of the inventive coils or spiral elements pinned together to form a fabric.

The coils or spiral elements may be formed from a monofilament or twisted multifilament, coated or uncoated, made from a polymer or polymers, such as polyester, a coated or uncoated metal wire, or from other materials known in the art. The coils may be formed as a continuous piece having an appropriate length for the width of the fabric/belt to be formed, as measured as the cross machine direction (CD) width of the fabric/belt. In some instances, a coil formed as a continuous piece may have the same length as, or nearly the same as, the width of the fabric/belt to be formed. Other coil lengths may be useful, such as lengths less then the width of the fabric/belt, or greater than the width of the fabric/belt and trimmed to an appropriate length. In other embodiments, the coils may be individual pieces formed into separate loops, with a number of individual loops arranged across the width of the fabric/belt.

Coils in this application are illustrated as having two enclosed interior portions or nodes, when viewed along the axis of the coil, for ease of illustration. This corresponds with the common infinity symbol or the mathematical lemniscate. However, coils of more than two enclosed interior portions or nodes are anticipated, and are also referred to as infinity coils because they comprise coil turns forming at least one infinity symbol or lemniscate. Such coils lend themselves to similar manufacturing techniques using a forming apparatus with a number of support members corresponding to the number of desired nodes. Infinity coils with more than two nodes have industrial uses, for example, uses similar to those disclosed for the two-node coils.

Figure 1:
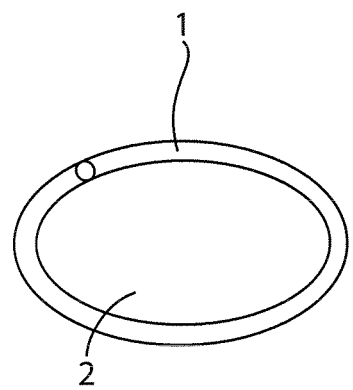
FIG. 1 is an axial view of a conventional spiral link coil.
Figure 1A:
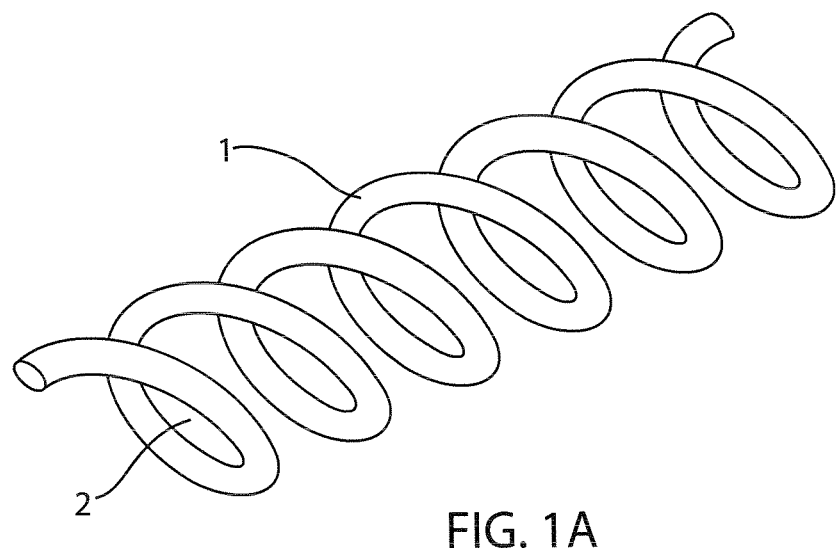
FIG. 1A is a perspective view of the conventional spiral link coil of FIG. 1.
Figure 2:
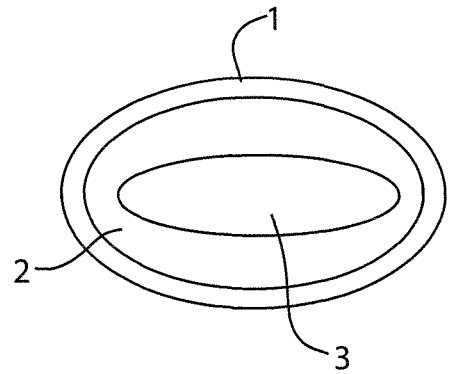
FIG. 2 is an axial view of the spiral link coil of FIG. 1 formed on a single mandrel.

A loop 1 for a conventional, prior art spiral coil spiral seam, as shown in an axial view in FIG. 1 and in a perspective view in FIG. 1A, has a curved shape, approximating a circular or ovular shape. Successive coils are similarly shaped and approximately coaxial, extending into the paper as illustrated. Typically, such coils are formed by placing successive coaxial coils of material, for example a polyester monofilament, on a single mandrel 3 as shown in FIG. 2. The open interior portion 2 is similarly shaped and proportional in size to the mandrel 3 upon which it is formed. Although an ovular shaped mandrel is shown, other shapes may be used for the mandrel.

The materials used may be a monofilament formed from one or more polymers such as polyester. In cross section, the spiral coils may be round, rectangular, oval, flattened, or other noncircular shapes.

Figure 3:
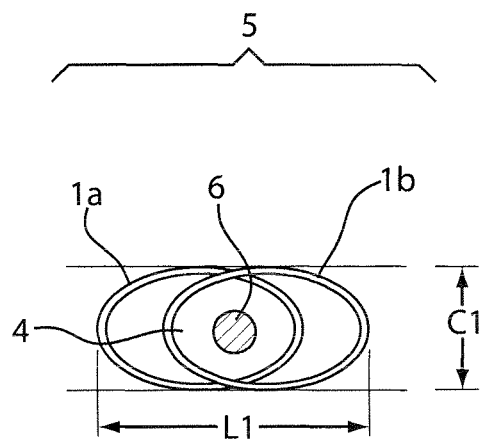
FIG. 3 is an axial view of conventional coils joined together by a pin.

When, for example, two coils 1a and 1b are joined to opposite fabric edges (not shown) and configured to form a spiral coil seam illustrated generally as 5 in FIG. 3, at least some of the open interior portions 2 of the two spiral coil loops 1 align to form a passage 4 to accept a pintle or pin 6, forming a seam joining the two fabric edges. The two conventional spiral coil loops 1 are generally free to pivot or rotate about the axis of the pintle which substantially corresponds with the axis of the seam 5.

An entire spiral link fabric can be produced from these prior art coils by interdigitating adjacent coils and inserting pins until the desired fabric length is acquired as taught in U.S. Pat. No. 4,839,213, the entire contents of which is incorporated herein by reference.

When the seam 5 of FIG. 3 (or a fabric constructed entirely of these prior art coils and pins) is placed in tension perpendicular to the axis of the seam/fabric which corresponds with the axis of the pintle 6, that is tension in the length direction of the industrial fabric, conventional spiral coil loops 1a and 1b tend to elongate slightly in the direction of the tension and contract slightly a distance in the direction perpendicular to the tension. That is, in the case of oval coils, the major diameter of the coils lengthens and the minor diameter shortens.

Figure 4:
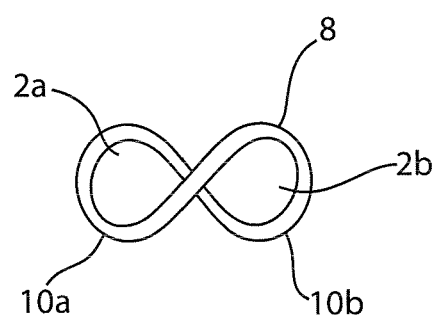
FIG. 4 is an axial view of an infinity coil according to one embodiment of the present invention.
Figure 4A:
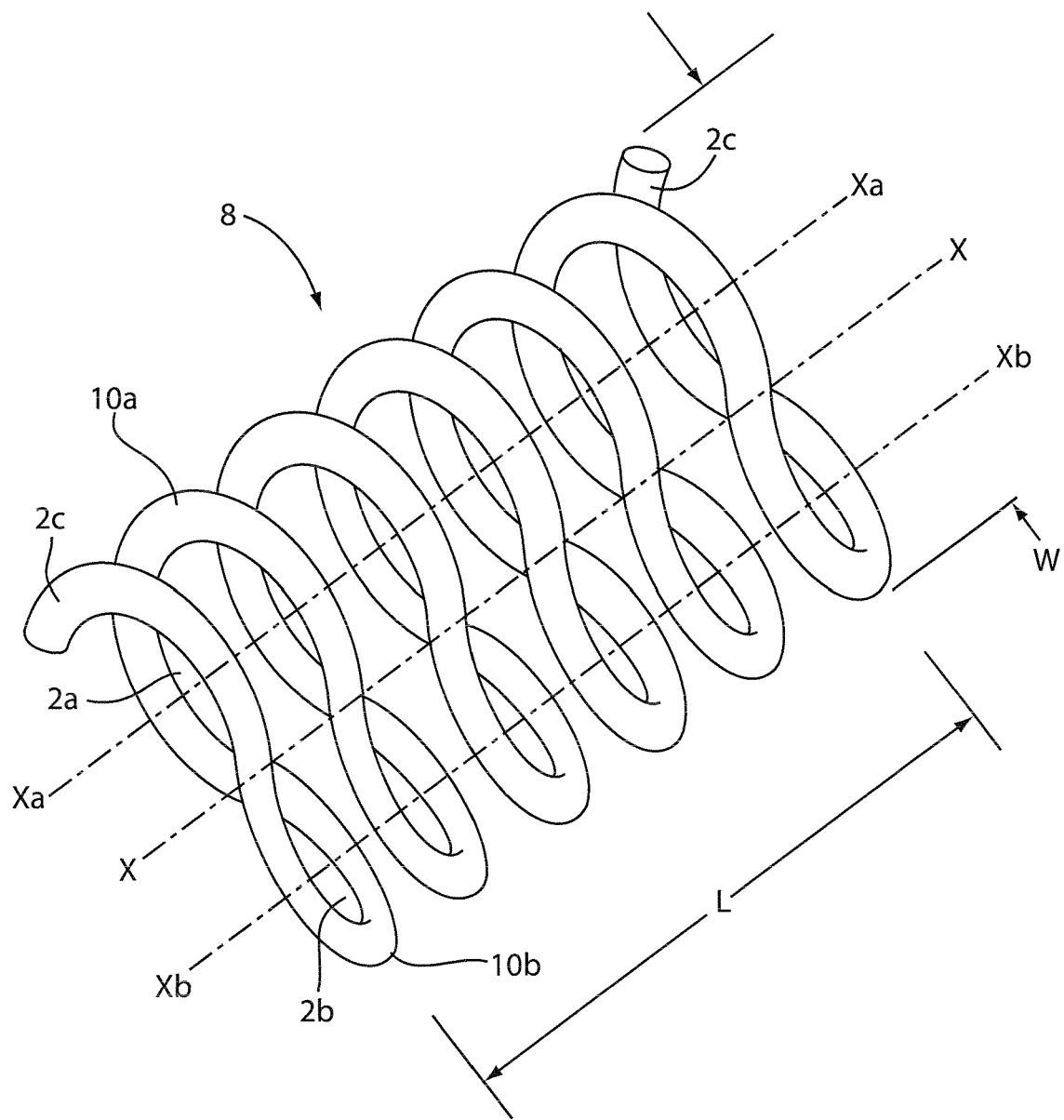
FIG. 4A is a perspective view of the infinity coil of FIG. 4.

According to one embodiment of the present invention, a spiral element is provided in the form of the infinity coil 8 in FIGS. 4 and 4A, formed as a figure-eight shaped curve, or a lemniscate, resembling a symbol commonly used to represent infinity, co. According to one embodiment of the present invention, a continuous helical infinity coil as illustrated in FIGS. 4 and 4A is an infinity coil formed from a continuous strand of material. When viewed parallel to the axis X-X of the coil, the continuous helical infinity coil will appear to have two closed curves forming first and second infinity coil loops 10a and 10b, respectively, with first and second open interior portions 2a and 2b, respectively. Coils according to embodiments of the invention may also have more than two open interior portions, yet are still referred to as infinity coils throughout the disclosure. For example, they can have three or more closed curves forming three or more adjacent coil loops, the three or more coil loops enclosing respective open interior portions, and intersection regions between adjacent coil loops in which the coil material forming a coil loop intersects with material forming an adjacent coil loop.

The material used to form infinity coils may be any of the materials known in the art as suitable for industrial fabrics, for example a polyester monofilament, and may have any suitable cross section. Circular cross sectional shapes of the material may be used. Additionally, in non-limiting examples, other cross section shapes may be used, such as oval, rectangular, square, triangular, flattened, star-shaped, grooved or other non-circular shapes may be used depending upon particular requirements.

FIG. 4A illustrates an infinity coil 8 according to one embodiment of the present invention. The coil 8 comprises first and second loops 10a and 10b. As shown, a plurality of loops 10a, 10b can extend along coil axis X-X in the direction of coil length L. Coil 8 may have any combination of number of loops 10a, 10b, and coil length L as determined by the particular application.

Width W of the coil is taken perpendicular to, or generally perpendicular to, the axis X-X and is the maximum dimension between the outermost portion of loop 10a and the outermost portion of adjacent loop 10b. The width W may be the same, or substantially the same, for all adjacent loop pairs 10a, 10b.

Within each of the coil loops 10a and 10b are open interior portions 2a and 2b, respectively. The open interior portions 2a and 2b have axes Xa and Xb, which are parallel, or generally parallel, to coil axis X. In embodiments of the inventive coils, the axis of all, or substantially all, first open interior portions 2a of first loops 10a are collinear. Similarly, in embodiments of the invention, the axis of all, or substantially all, second open interior portions 2b of second loops 10b are collinear. In some embodiments, axes X, Xa and Xb may be coplanar.

Figure 4B:
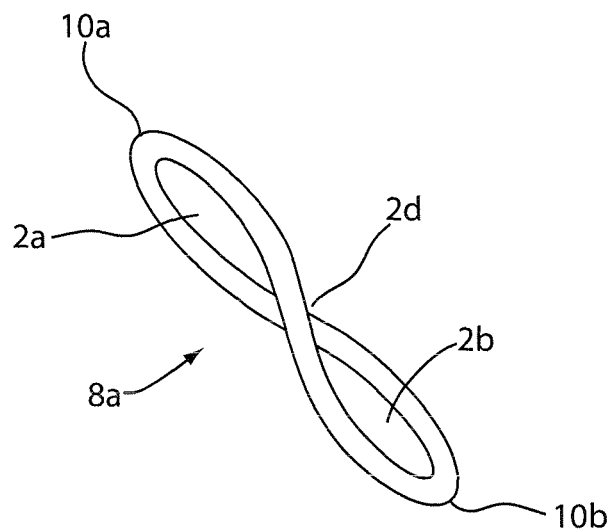
FIG. 4B is a perspective view of a separate infinity loop according to one embodiment of the present invention.
Figure 4C:
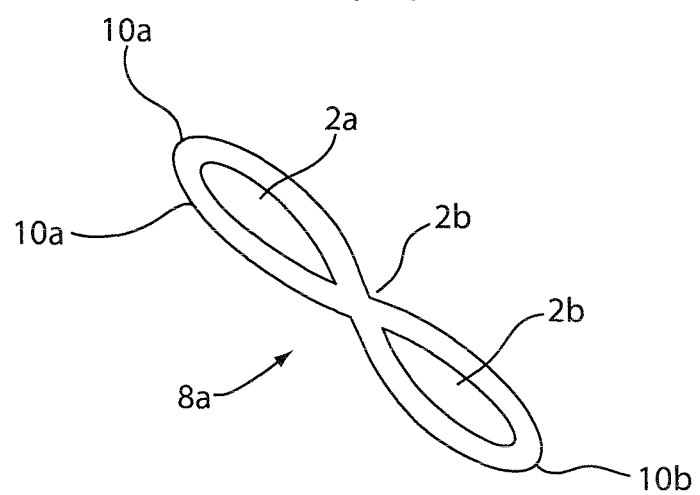
FIG. 4C is a perspective view of a separate infinity loop according to another embodiment of the present invention.

In addition to the plurality of loops 10a and 10b shown in FIG. 4A, embodiments of the invention include individual infinity coil elements 8a comprising at least one complete loop 10a and one complete loop 10b as illustrated in FIG. 4B. Individual coil elements 8a may be formed by cutting the coil element of FIG. 4 in an appropriate location to form two complete loops and joining the free end portions 2c to form the individual coil element. Portions of the coil 8a which cross, with one portion of the coil crossing over the other, or intersect, between the open interior portions 2a and 2b may be affixed to each other by adhesive, welding, bonding, or other known methods after formation of the coil 8a. Thus, one loop 10a and one loop 10b are formed, each loop forming a completely closed interior portion 2a or 2b, respectively, of individual coil element 8a. Alternately, other techniques may be employed in forming individual coil elements 8a, as shown, in FIGS. 4B and 4C. Individual coils can be formed from molten or softened polymers or resins by known plastic fabrication methods. Such methods include, as non-limiting examples, injection molding, extrusion molding, compression molding, transfer molding, or casting. In some embodiments, the portion of seam material 2d may intersect on the same, or substantially the same, plane between the open interior portions 2a, 2b of the coil 8a as illustrated in FIG. 4C. Thus the portion of coil 8a between the open interior portions 2a, 2b may be integrally formed with loops 10a and 10b. The individual coil elements 8a thus formed are comprised of one loop 10a and one loop 10b, joined at 2d, each loop forming a completely closed interior portion 2a or 2b, respectively.

As used herein, the term "infinity coil" includes both continuous helical infinity coils and individual infinity coil elements unless a distinction is made for clarity.

Figure 5:
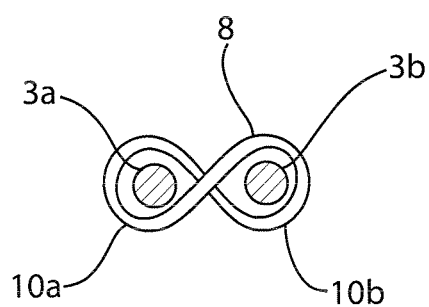
FIG. 5 is an axial view of the infinity coil of FIG. 4 formed on a double mandrel.

Continuous helical infinity coils 8 can be formed on a double mandrel coil former comprising generally parallel coplanar mandrels 3a and 3b as shown in FIG. 5. Infinity coils 8 can be formed, for example, by passing material, for example, polyester monofilament, over the top of a first mandrel 3a, through the space between the two mandrels, below and then around and over the top of the second mandrel 3b, back through the space between the mandrels and under the first mandrel 3a. Thus the coil forming material traces the path of a figure-eight as the infinity coils 8 are formed around mandrels 3a and 3b. This pattern can continue with each coil turn offset axially from the previous, until the desired number of coils, or the desired axial length of the infinity coil 8, which may be proportional to the number of coils, is formed. In this manner a spiral element comprising a plurality of infinity coils 8 can be formed with loops 10a and 10b, with each loop 10a forming coaxially with previous loops 10a and each loop 10b formed coaxially with previous loops 10b.

The two individual mandrels 3a and 3b comprising the double mandrel are illustrated as having a round cross section for ease of illustration only. The mandrels may be of any suitable shape to yield the desired shape of the infinity coil loops 10a and 10b. The mandrels are also shown as substantially the same size for ease of illustration. However, the mandrels 10a and 10b may be the same, or substantially the same size, or one mandrel may be larger than the other, or differently shaped, as desired.

Other techniques may be employed in forming the inventive infinity coils. For example, the infinity coil could be molded from a molten or softened polymer or resin as one piece using known molding methods, such as, for example, injection molding, extrusion molding, compression molding, transfer molding, or casting. The material used for the coil could also be extruded in a linear or near linear form and mechanically deformed into the lemniscate or infinity shape, with or without the application of heat. The material could also be extruded in a manner such that the extruded material forms the lemniscate or infinity shape either by moving the extruding head or by moving the bed or receptacle upon which the material is extruded.

Figure 6:
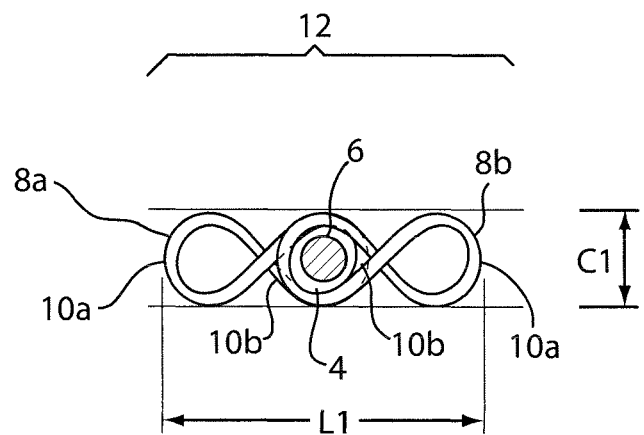
FIG. 6 is an axial view of two infinity coils joined by a pin according to one embodiment of the present invention.

According to one exemplary embodiment of the present invention, the industrial fabric/belt 12 can be formed by interdigitating two infinity shaped coils formed according to the above embodiments. In forming an infinity coil fabric/belt 12 a first infinity coil 8a is joined with a second infinity coil 8b via respective loops 10b of the infinity coils 8a and 8b using a known method of joining, such as a pintle, as illustrated in FIG. 6, for example. More specifically, loops 10b from first infinity coil 8a are interdigitated with loops 10b from second infinity coil 8b such that the open interior portions 2b of the loops 10b at least partially align and form a single passage 4 in the seam 12. The passage 4 may be sized to allow a pintle or pin 6 to pass through the aligned open interior portions 2b of loops 10b, joining the coil elements 8a and 8b. Similarly, a third infinity coil 8c (not shown) is joined to the second infinity coil 8b in the same manner in which 8b is joined to 8a, a fourth infinity coil 8d (not shown) is joined to the third infinity coil 8c in the same manner in which 8c is joined to 8b, and so on and so forth until the desired length of the fabric/belt is produced.

The loops 10b from the first and second infinity coil loops 8a and 8b may interdigitated and alternate, i.e., alternatingly interdigitate, one loop from a first coil, the next loop from a second coil, followed by a loop from the first coil in a repeated pattern along the length of the fabric. However, other patterns of interdigitation may be used as required.

Figure 8:
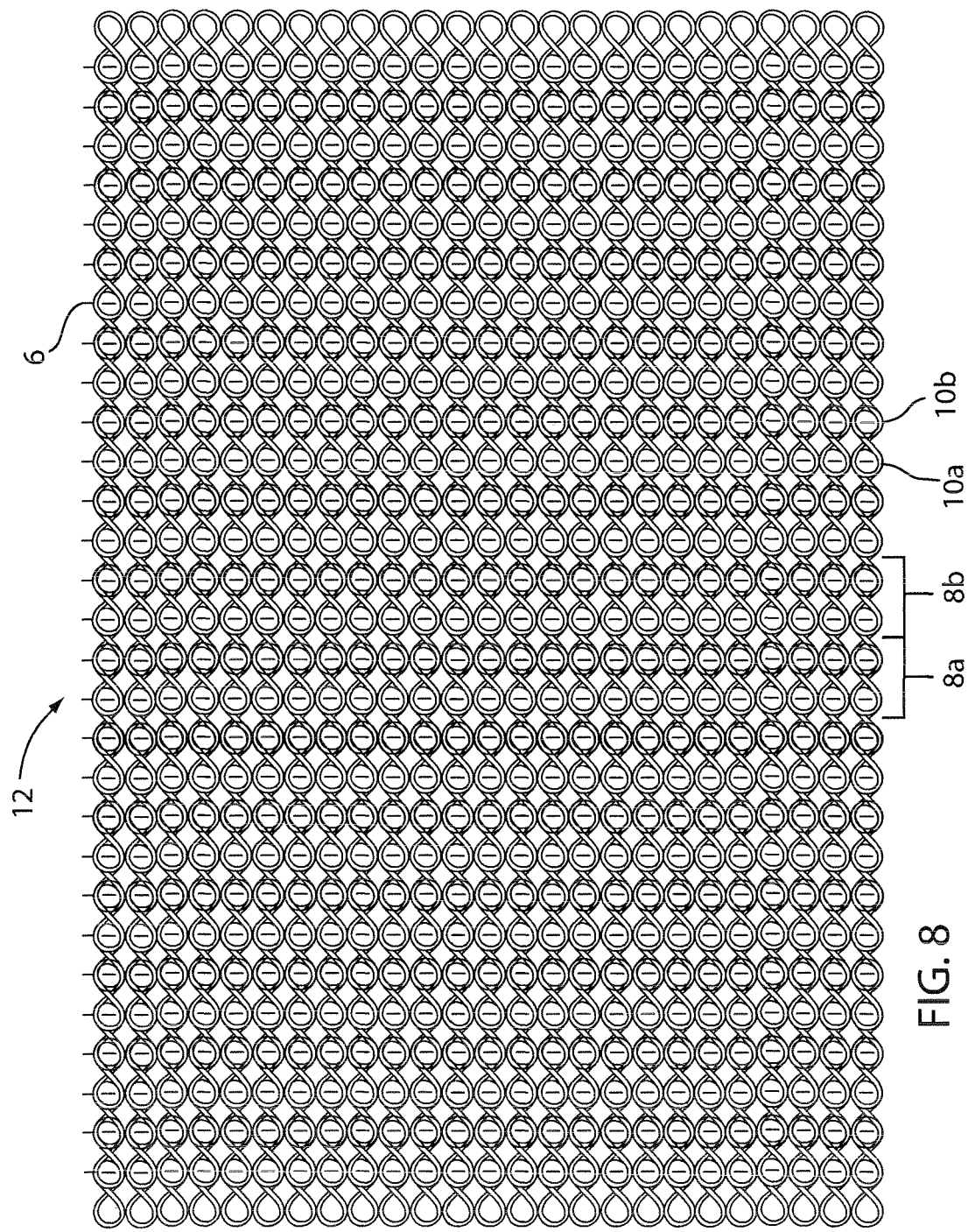
FIG. 8 is a plan view of an industrial fabric/belt with pintles inserted, according to one embodiment of the present invention.

According to one embodiment of the present invention, an industrial fabric 12 may be formed using several of the disclosed infinity coils interdigitated with one another and joined using pintles or pins 6, as shown in FIG. 8, for example. As illustrated in FIG. 8, infinity coils 8a, 8b, etc. may be joined to form fabric/belt 12 together. More specifically, infinity coils 8a and 8b may be drawn toward each other such that infinity loops 10b of infinity coil 8a may interdigitate with loops 10b of infinity coil 8b and open interior space 2b of infinity loops 10b at least partially align with each other to form a single passage (reference 4 in FIG. 6) as illustrated in FIG. 9, for example.

A pintle or pin 6 may be passed through the formed passage and through all, or substantially all, of the infinity coil loops 10b joining infinity coil 8a with infinity coil 8b.

Figure 7:
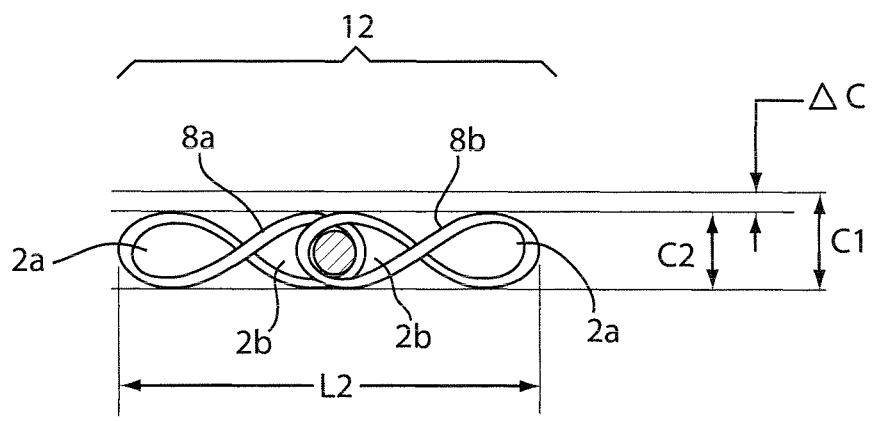
FIG. 7 is an axial view of the infinity coils of FIG. 6 under an increased tensile load transverse to the axis of the fabric/belt.
Figure 9:
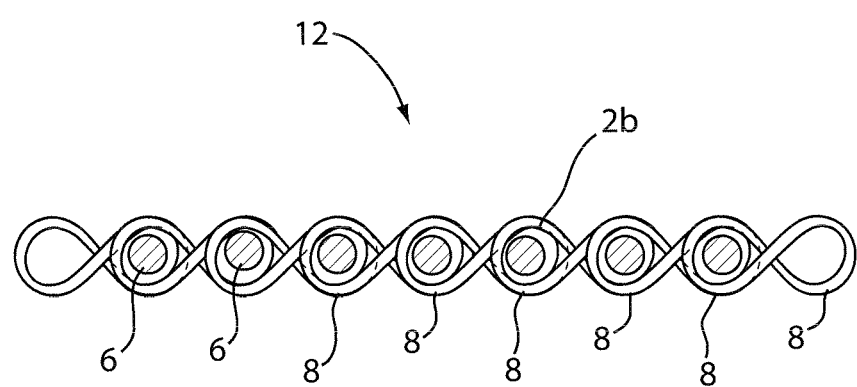
FIG. 9 is an axial view of the coil link fabric/belt shown in FIG. 8, according to one embodiment of the present invention.

The industrial fabric/belt 12 as shown in FIG. 9 behaves in a manner similar to the coils 12 in FIGS. 6 and 7. That is, when the industrial fabric 12 is under tension perpendicular to, or substantially perpendicular to, the fabric 12 in the length direction of the industrial fabric, that is, a longitudinal tension, will be under tension and experience some thinning. The flexible (compared to stiff prior art conventional spiral link coils) infinity coils 8a and 8b will decrease in thickness measured perpendicular to the longitudinal tension. The ΔC of FIG. 7 will be positive and the infinity coil loops will move away from the surface planes of the fabric, towards the interior of the fabric, resulting in thinning of the entire fabric. Concurrently, the length of the fabric, L1 in FIG. 6 will increase to L2 of FIG. 7. Depending upon use, for example as a dryer fabric, a thinner fabric carries less entrained air which can cause objectionable sheet blowing in the dryer section.

An additional advantage of the present technique is that during installation on an industrial machine, the last two coils on the two parallel fabric edges which will be joined together to make the fabric into an endless loop, the insertion of the pintle can be easier as the interior opening is larger during installation on the machine before running tension is applied than after tension is applied.

Another advantage of a fabric comprising these infinity shaped coils is the fact that there is no large open "interior space or void" as in prior art conventional spiral link coils. Therefore, no stuffer is required to obtain lower fabric air permeability, thereby reducing overall stiffness, mass, and fabric cost.

According to one embodiment of the present invention, an industrial fabric may be formed from a plurality of infinity coils 8 joined to each other to form an infinity coil link fabric. Spiral link fabrics, such as those disclosed in U.S. Pat. Nos. 7,575,659 to Billings and 7,360,642 to Perrin, assigned to the assignee of the present invention and incorporated by reference herein, disclose a spiral link fabric comprised of conventional spiral coils. Billings discloses a spiral link fabric for a papermaking machine, while Perrin discloses a spiral link belt for use as a conveyor belt.

In a similar fashion, the presently disclosed infinity coils can be joined with each other, with a pintle or the like, as in forming the fabric/belt 12 of FIG. 6. By interdigitating additional infinity coils 8, and joining the additional infinity coils with pintles 6 or the like as discussed above, and repeating the procedure, an infinity coil link fabric 18 could be produced, a portion of which is illustrated in FIG. 9 in a view taken parallel to the axis of the pintles 6. As shown, a plurality of infinity coils may be joined in the longitudinal direction until an infinity coil link structure or seam of suitable length is obtained. The width of the structure may be determined by the length of the infinity coils. In a fabric thus formed, opposite fabric edges may be joined with a pintle to form an industrial fabric (not shown) in the form of a continuous loop.

The benefits of an infinity coil link industrial fabric 18 include a thinner caliper and uniform mechanical characteristics throughout the width and length without the need to modify portions of the structure. Important in some applications is the uniform surface characteristics resulting from the lack of seams with a construction different than the remaining fabric, which may cause discontinuities in the surface characteristics.

According to one embodiment, industrial fabric/belt 12 can be formed using a plurality of infinity coil elements 8a, as shown in FIG. 4B, for example. In this embodiment, plurality of infinity coil elements 8a are aligned next to each other in a single row such that the desired width of the final fabric is achieved. Infinity loops 10a and 10b from adjacent rows of such infinity coil elements 8a are interdigitated and joined using pintles or pins 6, as described in the above embodiments to form a fabric/belt 12 of the required length. These steps may be carried out manually or may be carried out using a machine that is configured to align the individual elements in rows and then interdigitate infinity coil elements in adjacent rows in order to form the final fabric.

According to another embodiment, industrial fabric/belt 12 can be formed using a plurality of infinity coil elements 8a, as shown in FIG. 4C, for example. In this embodiment, plurality of infinity coil elements 8a are aligned next to each other in a single row such that the desired width of the final fabric is achieved. Infinity loops 10a and 10b from adjacent rows of such infinity coil elements 8a are interdigitated and joined using pintles or pins 6, as described in the above embodiments to form a fabric/belt 12 of the required length. These steps may be carried out manually or may be carried out using a machine that is configured to align the individual elements in rows and then interdigitate infinity coil elements in adjacent rows in order to form the final fabric.

Having thus described in detail various embodiments of the present invention, it is to be understood that the invention defined by the above paragraphs is not to be limited to particular details set forth in the above description as many apparent variations thereof are possible without departing from the spirit or scope of the present invention.

The invention claimed is:

1. A coil comprising:
   a plurality of infinity coil elements comprising a first loop, a second loop, and an intersection region wherein the first loop intersects and joins with the second loop, each of the first loops having an axis collinear with the axes of each of the other first loops and each of the second loops having an axis collinear with the axes of each of the other second loops, the axes of the first loops being parallel to and separated from the axes of the second loops;

wherein, when viewed parallel to an axis of the first or second loop, each of the first loops and second loops form a closed curve with a respective open interior portion; and wherein the coil is suitable for use in an industrial fabric and is formed from material selected from the group consisting of: a monofilament, twisted multifilaments, and metal wire.

2. The coil of claim 1, wherein the first loop and second loop form at least two closed curves.

3. A coil comprising:

a coil material formed as a lemniscate having two closed curves forming first coil loops and second coil loops, the first and second coil loops enclosing respective first and second open interior portions, and an intersection region between the closed curves in which the coil material forming the first coil loop intersects and joins with material forming the second coil loop, axes of the first coil loops being parallel to and separated from axes of the second coil loops; and wherein the coil is suitable for use in an industrial fabric and the coil material is formed from material selected from the group consisting of: a monofilament, twisted multifilaments, and metal wire.

4. The coil of claim 3, wherein the coil is coated.

5. The coil of claim 3, wherein the lemniscate is planar.

6. A coil comprising:

a coil material formed as three or more closed curves forming three or more adjacent coil loops, the three or more coil loops enclosing respective open interior portions, and intersection regions between adjacent coil loops in which the coil material forming a coil loop intersects with material forming an adjacent coil loop axes of the coil loops being separated from axes of successive coil loops; and wherein the coil is suitable for use in an industrial fabric and the coil material is formed from material selected from the group consisting of: a monofilament, twisted multifilaments, and metal wire.

7. The coil of claim 6, wherein the coil material is either:

a. molded to form the three or more adjacent coil loops, b. extruded in a substantially linear form and mechanically deformed into the three or more adjacent coil loops, or c. extruded such that extruded material forms the three or more adjacent coil loops either by moving an extruding head or by moving a receptacle upon which the material is extruded.

8. The coil of claim 6, wherein the coil is coated.

9. The coil of claim 6, wherein the adjacent coil loops are planar.

\* \* \* \* \*